(12) United States Patent
Li

(10) Patent No.: US 7,051,929 B2
(45) Date of Patent: May 30, 2006

(54) SECURE CREDIT CARD HAVING DAILY CHANGED SECURITY NUMBER

(76) Inventor: Gongling Li, Blk 22, Dover Crescent, #13-356, Singapore (SG) 130022

( * ) Notice: Subject to any disclaimer, the term of this patent is extended or adjusted under 35 U.S.C. 154(b) by 0 days.

(21) Appl. No.: 10/965,803

(22) Filed: Oct. 18, 2004

(65) Prior Publication Data

US 2006/0081700 A1     Apr. 20, 2006

(51) Int. Cl.
*G06K 5/00*     (2006.01)
(52) U.S. Cl. .................................... 235/380
(58) Field of Classification Search ............... 235/492, 235/380; 340/5.42
See application file for complete search history.

(56) References Cited

U.S. PATENT DOCUMENTS

| | | | | |
|---|---|---|---|---|
| 4,924,075 A | * | 5/1990 | Tanaka | 235/380 |
| 5,317,636 A | * | 5/1994 | Vizcaino | 705/65 |
| 5,580,794 A | * | 12/1996 | Allen | 436/169 |
| 5,585,787 A | * | 12/1996 | Wallerstein | 340/5.42 |
| 2003/0009374 A1 | * | 1/2003 | Moodie et al. | 705/14 |
| 2003/0024980 A1 | * | 2/2003 | Everett et al. | 235/380 |

FOREIGN PATENT DOCUMENTS

JP     2000057394 A  *  2/2000

\* cited by examiner

*Primary Examiner*—Michael G. Lee
*Assistant Examiner*—Kristy A. Haupt
(74) *Attorney, Agent, or Firm*—Lawrence Y.D. Ho & Associates

(57) ABSTRACT

A secure credit card having daily changing security number is disclosed. The upper half portion of the secure credit card has a magnet strip and its thickness is same as a normal credit card, so it can be read by a credit-card reader. The bottom half portion of the secure credit card contains a processor, key or keypad, battery, display window and a program download port. The processor is loaded with a predetermined program so that the processor can generate date and a daily renewed security number that can be shown on the display window. The security number is the function of the date and their relationship is defined by the predetermined program. Giving a date, a corresponding security number can be generated by this predetermined program. The computer of the credit card company keeps this predetermined program and can compute the security number of the date by this predetermined program. The security number of the date computed by the credit card company is identical to the security number of the date shown on the display window of the secure credit card. So that the valid of the credit card and its transaction can be verified by the credit card company based on the cardholder's name, card number and the security number of the date. With this secure credit card, the credit card payment becomes very secure even through internet.

7 Claims, 4 Drawing Sheets

SECURE CREDIT CARD HAVING DAILY CHANGED SECURITY NUMBER

TECHNICAL FIELD

This invention relates generally to a method and apparatus for the usage of credit card, more particularly, a secure credit card provides secure payment by this credit card at counter, through telephone or internet and eliminates the possibility for gang to make fraud credit card.

BACKGROUND OF THE INVENTION

In modern society, more and more people make their payment by credit card when they shop, purchase through internet, travel oversea, book hotel through telephone, etc. When they do so, they have to reveal full information of the credit card. It is a risk for cardholders and banks as malicious people may access to this information, they can use this information for their illegal payments, or forge a fraud credit card. Banks have lost millions dollars each year due to the payment made by fraud credit cards.

Currently, the credit card is secured by the information of credit card: cardholder's name, card number, and cardholder's signature. When a person makes his/her payment by a credit card, the clerk can verify this card by calling to the bank with the only information of the authorized cardholder's name and the card number. After that the cardholder (please notice the difference between the 'cardholder' and the 'authorized cardholder'. 'Authorized cardholder' is the person whom the bank issues the credit card to, 'Cardholder' is the person who holds a credit card, but the credit card may be a fraud credit card) signs on the invoice and takes away the purchased items. The bill will be sent to the person with the credit card account. There are two insecure factors: first, the clerks obtain the full information of credit card and they may reveal or leak the information to fraud-credit-card gang. Second, if the credit card is fraud one, the person with the credit card account will reject to pay. The bank will check the invoice and find out the fault signature, but it is too late as the malicious person has taken away the purchased items. It is even danger if the payment is carried out via internet as the gangs can hack information from internet easily.

The credit card system provides convenient and safe for credit card users as they do not need to carry many cashes when shopping, or travelling. However, the security information of credit card is shown on the card fully: The name of cardholder, the credit card number, and signature of cardholder. Every transaction by the credit card has the possibility of information leakage. Any information leakages endanger the banks and cardholders. To enhance the security of the credit card system, inventors have proposed many interesting ideas. Such as U.S. Pat. No. 4,667,087 presented a secure credit card with an opaque shield. The credit card number is hidden beneath this opaque shield. This shield can be rendered transparent after user inputs a correct password through a keypad. U.S. Pat. No. 5,446,273 revealed a credit card security system. In this system, cardholder inserts identifying information in electronic distorted form pertaining only to assigned holder. The system can check the validity of the card by examining the hidden information. U.S. Pat. No. 5,585,787 showed a programmable credit card whose identification information is readable by a reader device but is not discernible by the human eye. The completed account number and the identification information by a reader device are transmitted to the clearinghouse for verification. U.S. Pat. No. 5,742,035 proposed a credit card with memory aiding device for pin numbers. A thin label consisting of a geometric matrix helps the authorized cardholder to recognize the sequential pattern within the matrix and to recall the specific PIN. U.S. Pat. No. 5,818,030 put forward a credit card system with key module. This key module can be inserted into the main body of credit card. This programmable key module can open or lock access to the function of the main body of a credit card. Additionally, the credit card number can be displayed only at the LCD on the key module, so that without said LCD and ROM data and security codes properly inserted into the main body, the body of the card (and key module) each individually is merely a blank without information of the credit card. U.S. Pat. No. 6,188,309 suggested a method and apparatus for minimizing credit card fraud. This intelligent credit card requires user to input PIN number. If the PIN is correct, the card is then activated, and the credit card number is popped out by the output device. U.S. Pat. No. 6,270,011 brought forth a remote credit card authentication system. This system requires a fingerprint scanner at the point-of-sale to obtain fingerprint data, so that a credit card company database can verify the fingerprint data against stored fingerprint information and verify the transaction. For internet purchase, an authorization adaptor connected to the user PC provides the fingerprint scan, and sends the data to the credit card company for authentication. Most of those patents are not secure when use via internet or telephone. The last patent is also difficult for practical application as this system requires special adaptor for every user. However, there are some patents that can be applied to internet purchasing with high security. Such as U.S. Pat. No. 5,317,636 which disclosed a method and apparatus for securing credit card transaction. The credit card in this invention has a processor, a memory and a display window. When used, the card generates a verification number, which is based on a transaction sequence number and an encryption algorithm. The verification number is transmitted to a verification computer and is de-encrypted to a computed transaction sequence number. The transaction will be authorized if this computed transaction sequence number is corresponding to that stored in the computer. After each transaction, both the credit card and computer change their respective transaction sequence number. U.S. Pat. No. 5,478,994 demonstrated a secure credit card which prevents unauthorized transaction. The credit card has a programmable read only memory device programmed with a series of random number in a predetermined sequence. Both the credit card and host computer generate identical random numbers after each use of the credit card. These two patents provide a secure way for transaction of credit card as the cardholder has to present an additional changeable number for verification besides the card number and cardholder's name which are non-changeable. This additional number is changed to a new number after each transaction or each use of the credit card according to a predetermine sequence. So, even malicious person can steal the information of a credit card, but he/she can not use the information as the additional number is changed for next transaction.

The ideas behind these methods are good but it is difficult to be implemented. Usually, not all the credit card payments will require the verification from the credit card company. Second, there is a time lag for transaction in host computer of the credit card company. The time lag in transaction in host computer may cause error in the transaction sequence number. Third, if credit card payment is through internet, how to trigger the credit card and host computer for next additional number? And so on.

It is our objective of the invention to provide a secure credit card which is simple and yet secure for use. Cardholder can make payment via telephone and internet securely. The manufacturing cost of this secure credit card is very low as it uses very simple principle, and this secure credit card system does not require any additional apparatus for implementation, so the credit card company does not need to invest much money to implement this secure credit card, but does save a lot money on the battle with the fraud-credit-card gangs, and have potential to expand the credit card business on internet shopping, e-commerce, etc.

SUMMARY OF THE INVENTION

These and other objectives of the invention are realized in a secure credit card comprising a card body, processor, display window, key or keypad, program download port and a battery.

The card body has two portions, the upper half portion and bottom half portion. The upper half portion is exactly same as the upper half portion of a normal credit card having a magnetic strip, card number, and the same thickness. So that the upper half portion of the credit card can be inserted into a normal card reader for reading out the information. The bottom half portion of the credit card is slightly thicker as this portion has to contain a processor, display window, key or keypad, program download port and a battery. The processor is loaded with a predetermined program which can generate date, month, year (DD/MM/YY) and a daily changed security number. This security number is a function of DD/MM/YY defined by this predetermined program. When DD/MM/YY changes, the security number is changed also. When a cardholder wants to make payment by credit card, he/she presses the key, the processor is activated and the date, month, year and the corresponding security number appear on the display window for a while (the display window is normal-off, so that the battery can last for quite a few years enough to cover the valid period of a credit card). Cardholder has to provide the security number and date (DD/MM/YY) besides the cardholder's name and card number. This information can be sent to the host computer of the Bank (or the credit card company) for authentication. The host computer has kept the information of the credit-card account and the predetermined program, and it can generate a computed security number by the predetermined program with the date (DD/MM/YY). If these two security numbers—one given by the cardholder and another by the host computer—are identical, then the transaction is approved or a confirmation is sent back to the shop. As the security number is changed everyday (or every half day—am or pm), the security number is valid for purchase only on that day (or half day). Therefore, it is safe to make payment via internet as the exposed information of the credit card—card number, cardholder name and security number—is valid only on the payment day (or half day). The exposed information is not able to be used by gangs to fabricate another fraud credit card.

The implementation of this secure credit card does not require any additional apparatus. The host computer of the Bank is not required to increase its memory significantly as only a simple program is added to each credit card account. The only cost incurred is the manufacturing cost of the secure credit card. However, as this secure credit card employs very simple technology with only a few electronic components, its cost should be very low for mass production.

To extend the protection to the situation when a credit card is lost or is stolen, a PIN can be used to activate the display window. The card number or cardholder's name is not printed on the credit card. Only a correct PIN is inputted then the display window is activated. The same processor can fulfill this function easily. When a credit card is used for payment, the cardholder has to enter the PIN through the keypad. The display window is on if the PIN is correct. The display window can display the card number or cardholder's name, the date (DD/MM/YY) and security number sequentially or simultaneously.

DETAIL DESCRIPTION OF THE DRAWINGS

The invention will now be further explained by means of examples only and with reference to the following drawings wherein.

DETAILED DESCRIPTION OF THE INVENTION

Figure 1:
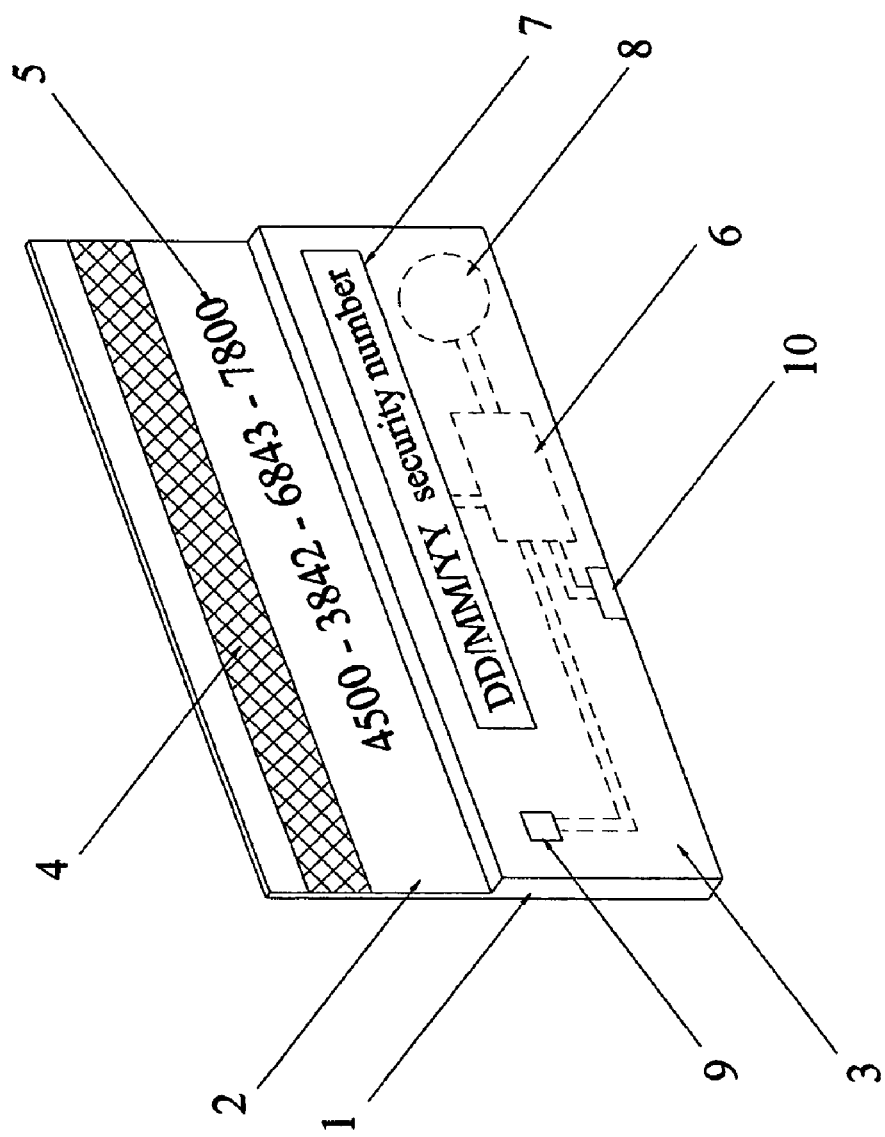
FIG. 1 is an isometric view of a secure credit card with an on/off key.

FIG. 1 shows isometric view of this secure credit card. The card body 1 has two portions—the upper half portion 2 and bottom half portion 3. The upper half portion 2 of this secure credit card is same as the normal credit card having a magnetic strip 4, credit card number 5, and authorized credit cardholder's name and signature (could not be seen in the figures as they are printed or written on the other side of the credit card). This portion of the credit card has the same thickness as the normal credit card. So the upper half portion 2 of this secure credit card can be inserted into a normal credit-card reader for data reading. The bottom half portion 3 is slightly thicker so as to cater for the electronic components. A processor 6, display window 7, battery 8 (or other mean of power source), on/off key 9 (or any other mean of controller) and program download port 10 are embedded in the bottom half portion 3. Those electronic components may be mounted on a PCB (Printed Circuit Board) with other necessary electronic components (such as resistances, capacitors etc. but they are not shown in the figures), or they can be integrated together as one or two elements (not shown in the figures) depending on manufacturing technology. Before the credit card is issued to the authorized cardholder, a predetermined program is loaded into the processor 6 through download port 10. This program can generate the correct date (DD/MM/YY) requiring no adjustment during the valid period of the credit card, and produce a new security number every day (or every half day: am. and pm.). The security number is a function of the current date:

Security number=$f$(DD/MM/YY)

An example of 6-digit security number is given here:
The first two digits a1a2:

$a1a2=|100-int(DD\times 4.6)|$

The second two digits a3a4:

$a3a4=int|DD-MM|\times 3.2-98|$

The third two digits a5a6:

$a5a6=int(|DD/YY-MM|\times 5.8)$

DD is date, MM is month and YY is year. "int" is the computation command to trim the number as an integer. The numbers of 100, 4.6, 3.2, 98 and 5.8 in these three equations are randomly selected.

For example, the current date is 28/07/03, the security number computed by these 3 equations is 28 30 13 (a1a2 a3a4 a5a6).

In the following day—29/07/03, the security number becomes 33 27 15.

These examples illustrate clearly that the security number can be varied as a function of the date (DD/MM/YY), and the function can be a few simple equations. The security number is not confined at numerical numbers, it can be the combination of alphabet and number too.

Before a secure credit card is issued to an authorized cardholder, a predetermined program is loaded into the processor 6 of the credit card. This program can generate the date (DD/MM/YY) and compute a new security number every day. The bank also stores the program under the account of the credit card. When the cardholder makes payment by the credit card, he/she presses the on/off key 9, the date and the correspondent security number are displayed on the display window 7. The cardholder must submit the cardholder's name, card number, and security number together with the current date (as the payment date) to the counter clerk or to remote supplier via internet or telephone. This information then is sent to the bank for authentication. The bank retrieves the stored program from the corresponding account and computes a security number based on the payment date sent by shop clerk or supplier. If both the security number sent by the cardholder and that computed by bank is identical, the transaction is approved, otherwise rejected. Since the security number is changed every day (or every half day), the information of a credit card exposed to the people or in the internet will not put a risk to the authorized cardholder and bank as malicious people or gangs can not make illegal payment or forge a fraud credit card based on this varying information.

Figure 2:
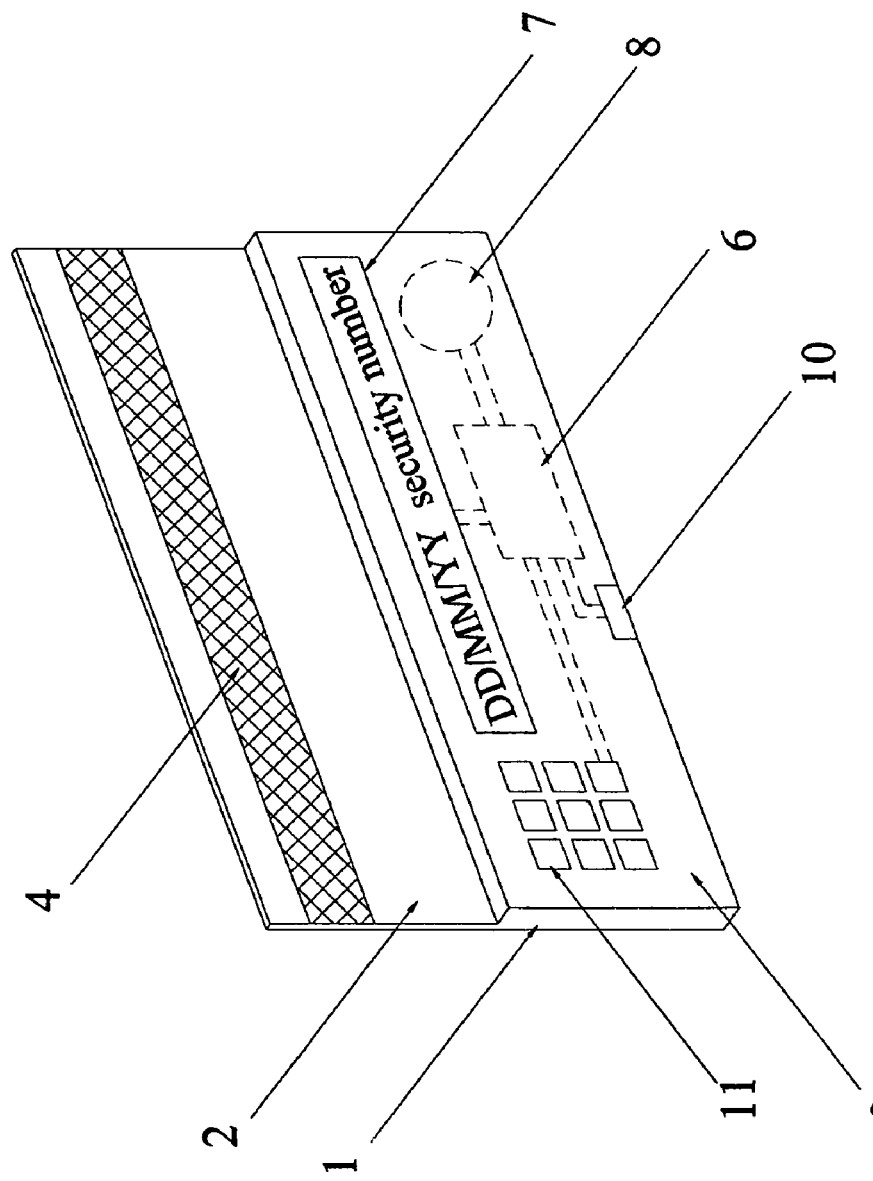
FIG. 2 is a an isometric view of a secure credit card with a keypad for PIN input

This secure credit card also can protect the cardholder when the credit card is lost or stolen by adding in PIN number. Refer to FIG. 2, the key 9 is replaced by a keypad 11 and the card number or cardholder's name is not printed on the credit card. When the bank issues the credit card to an authorized cardholder, a PIN number is also sent to the person. Each time the cardholder uses the credit card, he/she must enter the PIN through keypad 11 to the secure credit card. If the PIN is correct, then the cardholder's name or card number, date and security number of the date are shown on the display window 7, otherwise the display window 7 shows nothing.

Figure 3:
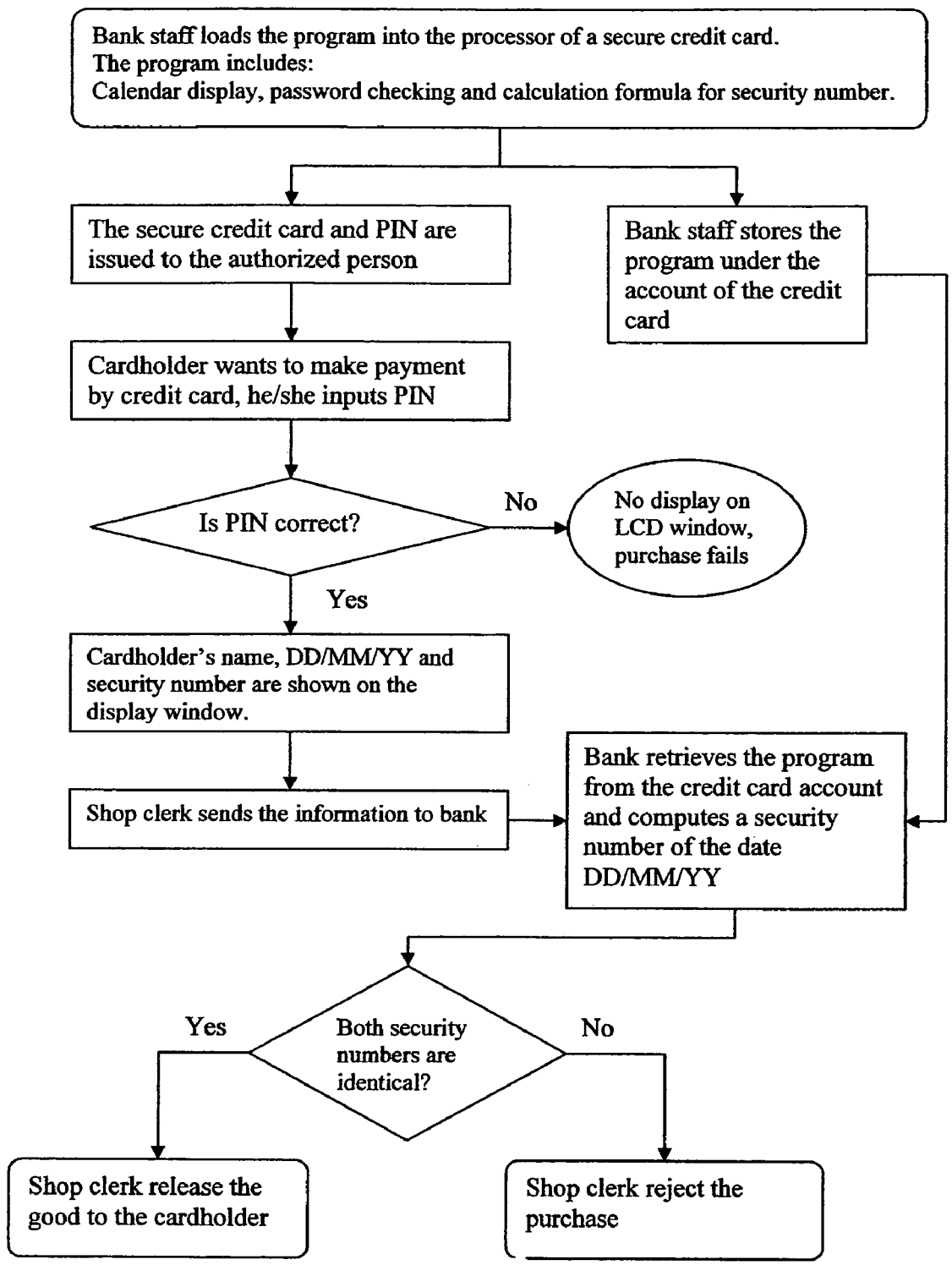
FIG. 3 is the flow chart to illustrate how the secure credit card works.

FIG. 3 summarizes how this secure credit card works. Bank staff loads the predetermined program into the processor 7 of a secure credit card. The program includes: Calendar display, password checking and calculation formula for security number. Bank staff also stores this program under the account of the credit card. Then the secure credit card and PIN are issued to the authorized person. When the cardholder wants to make payment by credit card, he/she enters PIN to the credit card through the key pad 11. If the PIN is correct, then Cardholder's name or card number, DD/MM/YY and security number are shown on the display window 7. To verify the validation of the credit card, shop clerk can send the information to Bank. The Bank retrieves the stored program under the account of the credit card and computes a security number of the date. If both the security numbers are identical, confirmation will be sent back to shop.

Figure 4:
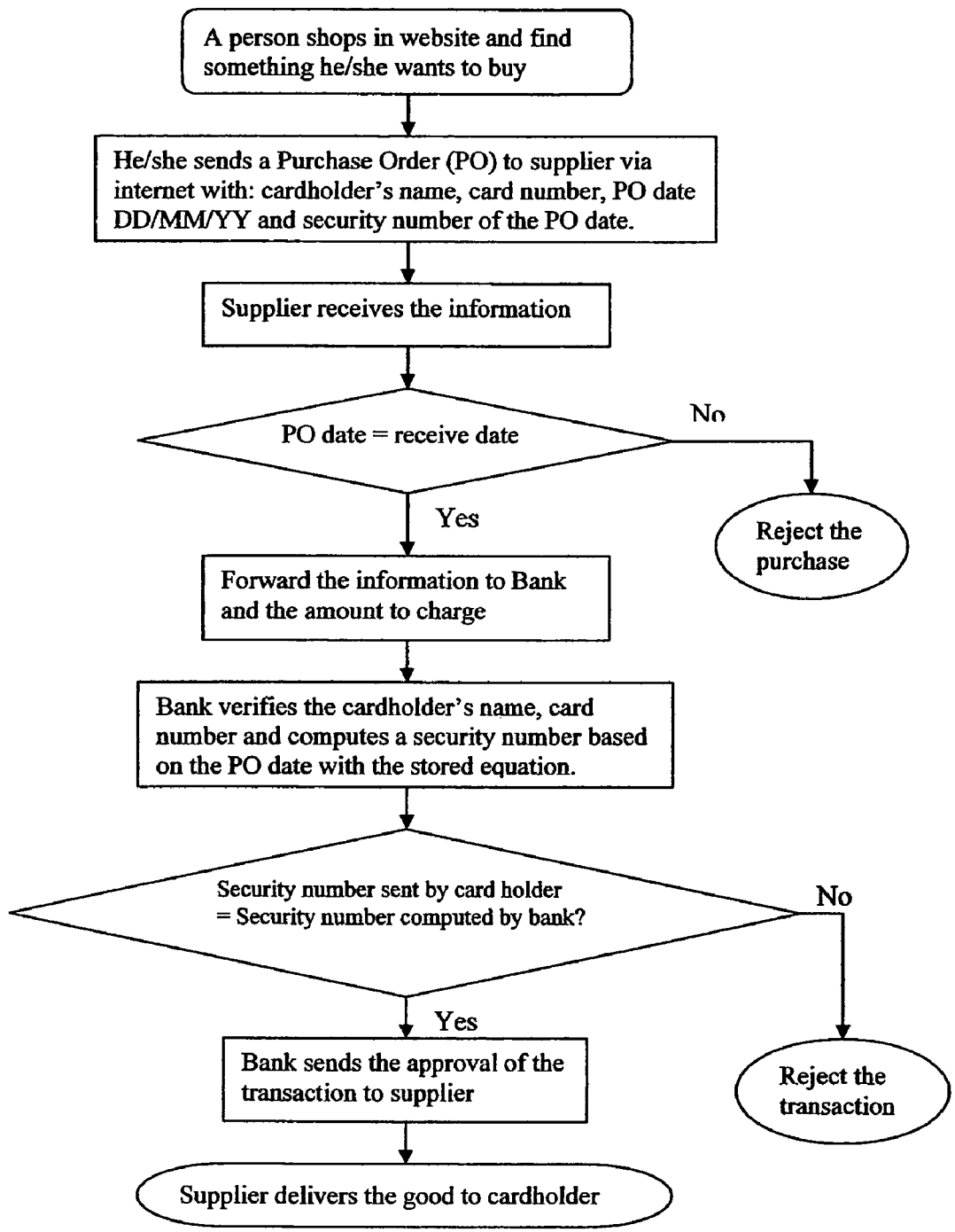
FIG. 4 is the flow chart to illustrate how to make payment securely by this secure credit card via internet.

FIG. 4 illustrates the process of credit card payment via internet. A person shops in websites and finds something he/she wants to buy. He/she sends supplier a Purchase Order (PO) together with the information of his/her credit card: cardholder's name. card number and PO date and security number of that date. When the supplier receives the PO, supplier will check whether the PO date is same as the date of received file (time readjustment is required if the customer is from different time zone). If yes, then the amount of money and the information of the credit card are sent to the bank for transaction approval. This step is to eliminate the possibility for a malicious person using other's obsolete information to make illegal payment. When the bank receives the requested transaction, the bank retrieves the stored program under the account of the credit card and computes a security number of the date. If both the security numbers are identical, the bank approves the transaction, and supplier will deliver the purchasing items to the customer.

With this secure credit card, the website shopping is secure.

The invention claimed is:

1. A secure credit card comprising:
a card body;
a processor embedded within the card body; wherein the processor contains a predetermined program that can generate a correct date and produce at least one new security number per day; and wherein the security number is the function of the date, and the relationship between the security number and the date is defined by the predetermined program;
a display window located on one surface of the card body for displaying the correct date and the at least one new security number generated by the processor;
a controller located on one surface of the card body for controlling the status of the processor;
a power source disposed within the card body for powering the processor; and
a program download port for downloading the predetermined program into the processor;
wherein a host computer for authorizing the transactions of the secure credit card contains the predetermined program that matches with the card number of the secure credit card;
thereby the host computer can compute a security number of the date which is identical to said security number of the date produced by said processor in said secure credit card; and
whereby the secure credit card with the at least one security number per day prevents credit card frauds.

2. A secure credit card according to claim 1 wherein said power source is a battery.

3. A secure credit card according to claim 1 wherein said controller is a key.

4. A secure credit card according to claim 1 wherein said controller is a keypad.

5. A secure credit card according to claim 1 wherein display window is a LCD (Liquid Crystal Display) window.

6. A secure credit card according to claim 1 wherein said card body has two portions, upper half portion and bottom half portion,
said upper half portion has the same thickness as a normal credit card, and there is a magnetic strip on said upper half portion,
said bottom half portion contains with said processor, display window, power source, controller and said program download port.

7. A secure credit card according to claim 1 wherein said processor, display window, program download port, controller and power supply can be integrated into one element or two elements.

\* \* \* \* \*